United States Patent
Lipson

(10) Patent No.: US 7,661,945 B2
(45) Date of Patent: Feb. 16, 2010

(54) APPARATUS FOR EXTRUDING AND BLOW MOLDING MULTICOLORED PLASTIC ARTICLES

(76) Inventor: Erik Lipson, 200 W. Washington Sq., #1809, Philadelphia, PA (US) 19106

( * ) Notice: Subject to any disclaimer, the term of this patent is extended or adjusted under 35 U.S.C. 154(b) by 0 days.

(21) Appl. No.: 12/233,181

(22) Filed: Sep. 18, 2008

(65) Prior Publication Data
US 2009/0074899 A1 Mar. 19, 2009

Related U.S. Application Data

(60) Provisional application No. 60/973,246, filed on Sep. 18, 2007.

(51) Int. Cl.
*B29C 47/06* (2006.01)
*B29C 47/24* (2006.01)
(52) U.S. Cl. .............. 425/131.1; 425/380; 425/382.3; 425/462
(58) Field of Classification Search ............ 425/131.1, 425/133.1, 380, 382.3, 462
See application file for complete search history.

(56) References Cited

U.S. PATENT DOCUMENTS

| | | | | |
|---|---|---|---|---|
| 2,174,779 | A * | 10/1939 | Jean Delorme | .......... 425/131.1 |
| 3,718,413 | A | 2/1973 | Luraschi et al. | |
| 3,778,207 | A | 12/1973 | Luraschi et al. | |
| 6,926,858 | B2 * | 8/2005 | Cree | .......... 264/514 |
| 2005/0006804 | A1 * | 1/2005 | Hartman | .......... 264/45.9 |
| 2006/0038310 | A1 | 2/2006 | Lipson | |
| 2007/0141194 | A1 * | 6/2007 | Rubbelke | .......... 425/461 |

* cited by examiner

*Primary Examiner*—Robert B Davis
*Assistant Examiner*—Joseph Leyson
(74) *Attorney, Agent, or Firm*—Gifford, Krass, Sprinkle, Anderson & Citkowski, P.C.

(57) ABSTRACT

Cylindrical extrusions having multiple colors, capable of serving as parisons for subsequent blow molding operation, are formed in an apparatus in which plastics of each color to be incorporated in the finished product are fed by separate extruders to an extruding head having a stack of cylindrical spools each formed with a number of apertures around their periphery. The apertures in each spool are interleaved with corresponding apertures in the other spool or spools. The interiors of the apertures are fed into a conduit which extends coaxially with the axes of each of the spools so that the outputted plastic has multicolored stripes along its length. In an embodiment in which the spool is rotated in timed relation to the feed from the extruders, the output is twisted along the central axis to form a "barber pole" stripe arrangement. In an alternate embodiment a programming plate is disposed beneath the output. The plate has apertures which align with certain of the feeds from the spool and block others, and the plate may be rotated between a number of alternating positions to provide extrusions with horizontal stripes or checkerboard patterns. By blow molding the resulting parisons, multicolored containers with interesting patterns may be produced.

5 Claims, 4 Drawing Sheets

FIG. 4
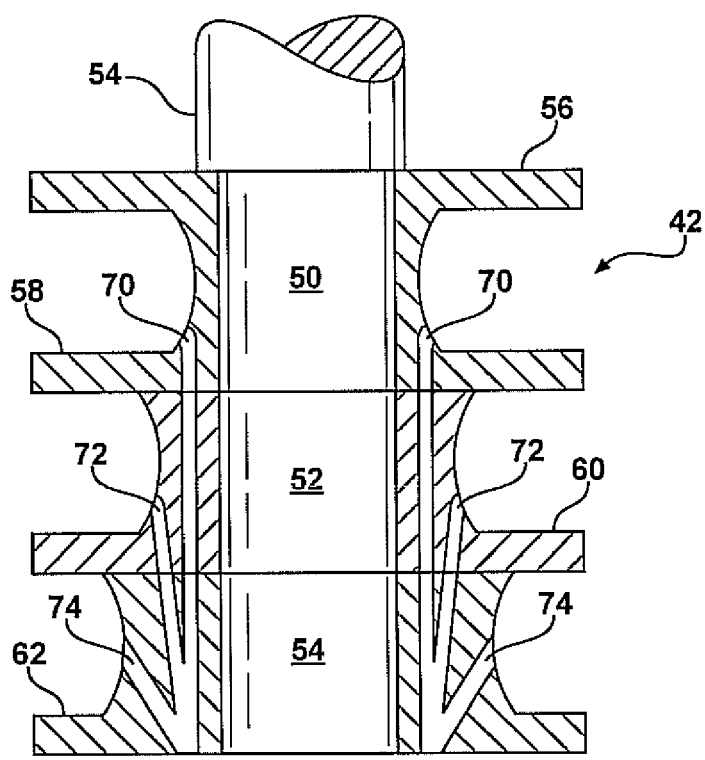
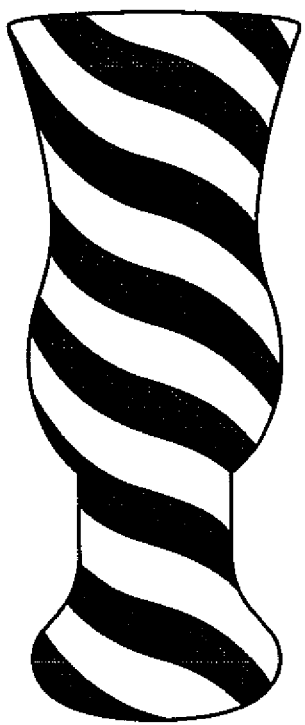
FIG. 5A
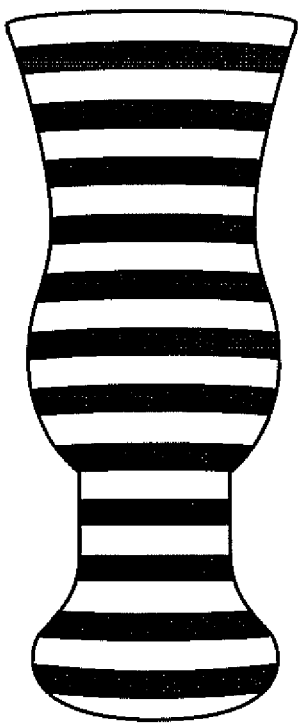
FIG. 5B
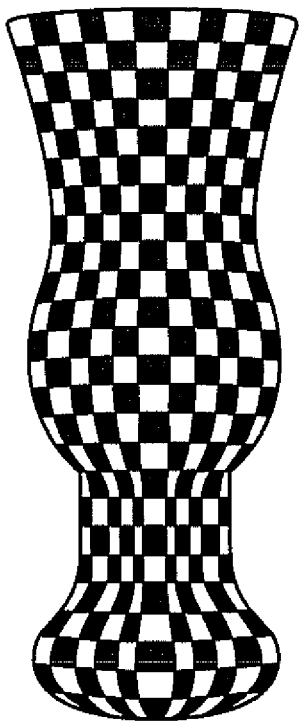
FIG. 5C

APPARATUS FOR EXTRUDING AND BLOW MOLDING MULTICOLORED PLASTIC ARTICLES

CROSS-REFERENCE TO RELATED APPLICATIONS

This application claims priority of U.S. Provisional Patent Application Ser. No. 60/973,246 filed Sep. 18, 2007, which is incorporated herein by reference.

FIELD OF THE INVENTION

This invention relates to methods and apparatus for extruding plastic objects having multicolored surfaces and more particularly to apparatus including a plurality of extruders, one for each color, feeding a common extruding head of novel construction which may be moved during the extrusion process to produce multicolored products with patterns such as stripes transverse to the extrusion axis, checkerboard patterns or "barber pole" stripes, all of which extrusions may be used as parisons during a subsequent blow molding process to produce containers.

BACKGROUND OF THE INVENTION

My U.S. patent application Ser. No. 11/193,599, filed Jul. 29, 2005, discloses a method and apparatus for forming extruded striped plastic products with variations in the width of the stripes along the length of the product, and for blow molding articles formed from such extruded parts. Broadly, that invention involves feeding different colored plastics from separate extruders into a common extruding head and varying the feed rates from the plural extruders in a coordinating manner to produce extruded products with stripes extending along the extrusion axis, and of varying width along the extrusion axis. These extrusions may act as parisons in a subsequent blow molding process to produce containers having interesting multicolored patterns. By coordinating the width variations produced in the color patterns during extrusion with the shape of the dies in the blow molding process, a variety of interesting containers may be produced.

U.S. Pat. No. 3,718,413 and a continuation-in-part, U.S. Pat. No. 3,778,207, disclose machines for manufacture of thermoplastic laminates of multiple colors, employing separate extrusions for each color feeding from a common die.

SUMMARY OF THE INVENTION

The present invention is directed toward a multicolor extrusion process of this broad class wherein plural extruders, each supplying a plastic of a different color, feed a common extrusion head. By moving parts of the extrusion head during the extrusion process, a variety of interesting patterns may be obtained.

In a preferred embodiment of the invention, subsequently described in detail, cylindrical extrusions are formed which may serve as parisons for use in subsequent blow molding operations. An extrusion head includes a number of cylindrical spools stacked one above the other, on a common axis, with one spool being provided for each color to be extruded. For example, in an embodiment of the invention employing three extruders, each of a different colored plastic, the extruding head employs three cylindrical spools. Each spool has an array of apertures formed about its diameter and extending from the exterior of the spool, which receives the plastic from an extruder, to feed passages which extend along the axis of the spools and are interleaved with passages from the other spools. For example, each spool may have twelve passages feeding elongated apertures. The apertures feed along the axis of the spools and at the output there will be thirty-six apertures, with the outputs of adjacent apertures producing different colored plastics. These apertures feed into the pin and dye input of the extrusion head. By rotating the spools about their central axis in timed relation to the feed of the extruded plastic, the output of the pin and dye will be a spiral "barber pole" cylinder.

Alternatively, a program plate may be disposed between the output of the stack of spools and the pin and dye. The program plate will have a circle of holes each aligned with certain outputs of the apertures and in turn feed the pin and dye plate. There will be a lesser number of holes in the circle of holes in the program plate than the output of the spool so that in a particular position the program plate will block certain of the holes and allow the output of plastic from others. By shifting the rotational orientation of the program plate in timed relation to the feed of plastic through the extrusion plate, a variety of interesting multicolored patterns may be achieved in the extruded parts, such as stripes extending transversely to the extrusion axis or a checkerboard pattern covering the entire surface of the extruded part. By rotating the stack of spools in timed relation to shifting of the program plate, a distinctly different color pattern may be achieved.

These color patterns in the extrusions are preferably coordinated with the shape of blow molding dies used in a subsequent blow molding operation to produce multicolored containers having a variety of interesting patterns.

BRIEF DESCRIPTION OF THE DRAWINGS

Other objects, advantages and applications of the present invention will be apparent by the following detailed description of several embodiments of the invention. The description makes reference to accompanying drawings, in which:

FIG. 4 is a cross-sectional view through the spools of the extrusion head;

FIG. 5A is a side view of a container formed by the apparatus of FIG. 1 having a multicolored "barber pole" configuration;

FIG. 5B is a side view of a container formed by the apparatus of FIG. 1 having horizontal two-colored stripes; and FIG. 5C is a container formed in accordance with the apparatus of FIG. 1 having a checkerboard multicolored configuration.

DETAILED DESCRIPTION OF THE INVENTION

The system of the present invention operates upon thermoplastic materials such as cellulose acetate, cellulose acetobutyrate, methyl methacrylate, polystyrene, ABS, polycarbonate, or other thermoplastic resins. In order to form a multicolored product, a plurality of extruders are required, one for each color. The plastics may be of all the same composition with a different coloring agent. The products formed in accordance with the present invention will typically have two or three different colors but may include larger numbers.

Figure 1:
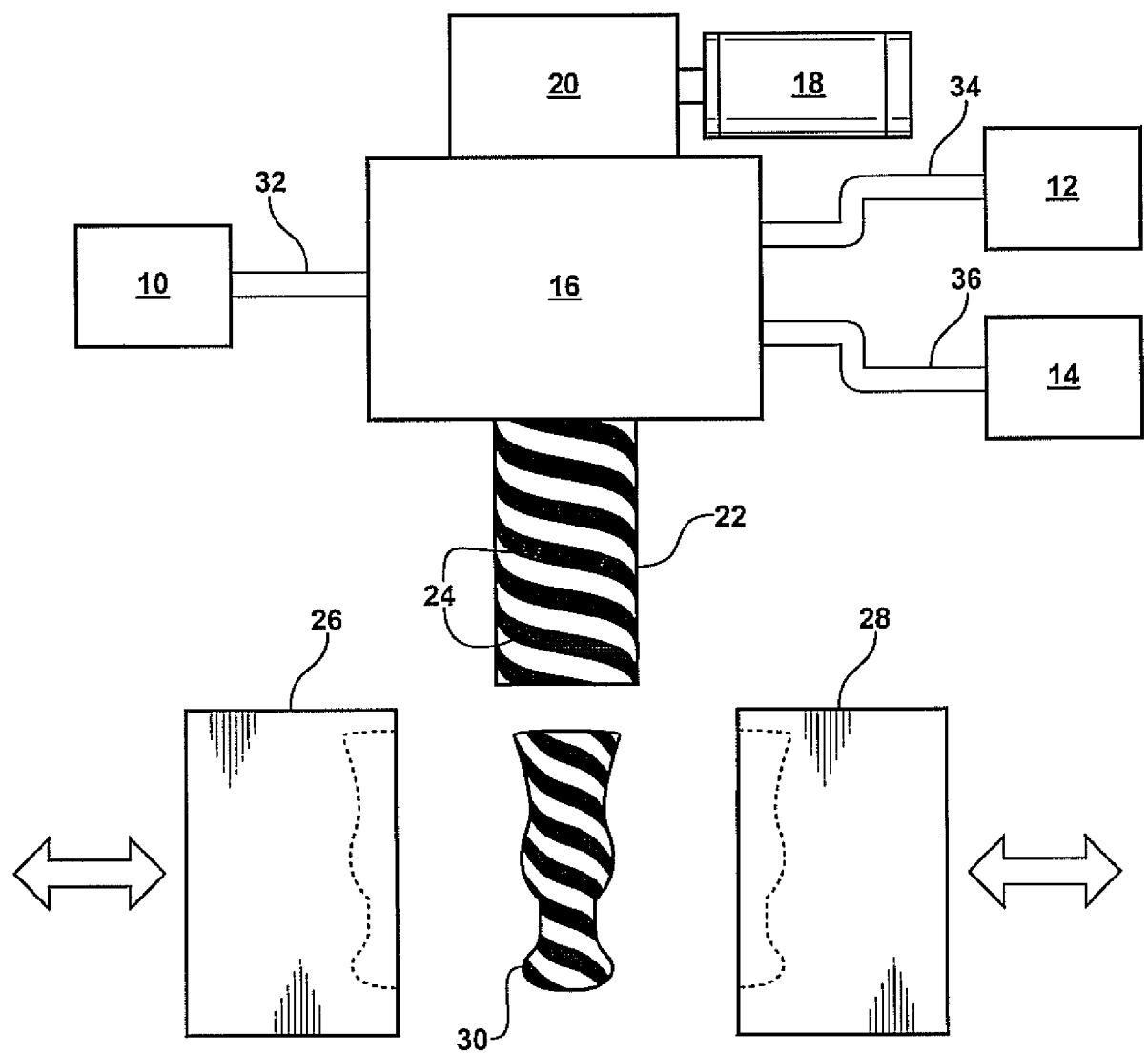
FIG. 1 is a schematic diagram broadly illustrating the apparatus and method for forming a "barber pole" striped parison and then blow molding a container from the parison.

The apparatus illustrated in FIG. 1 is intended to produce either two or three colored products and has three extruders 10, 12 and 14. Each of the extruders feeds into an extruding head, generally indicated at 16, and described in greater detail in the subsequent drawings. The extruding head 16 includes an electric motor 18 which drives the head 16 through a gearbox 20. As will be detailed subsequently, the extruding head 16 operates to produce a cylindrical plastic product 22 which is illustratively shown with spiral stripes 24 in a "barber pole" arrangement. The product 22 may represent the output of the process or it may produce a parison for a subsequent blow molding operation including a pair of blow molding molds 26 and 28, which may be moved together over the parison and properly operated in accordance with blow molding techniques to produce a final product such as a drinking vessel 30 with the same spiral striped pattern involved in the parison 22.

Figure 2:
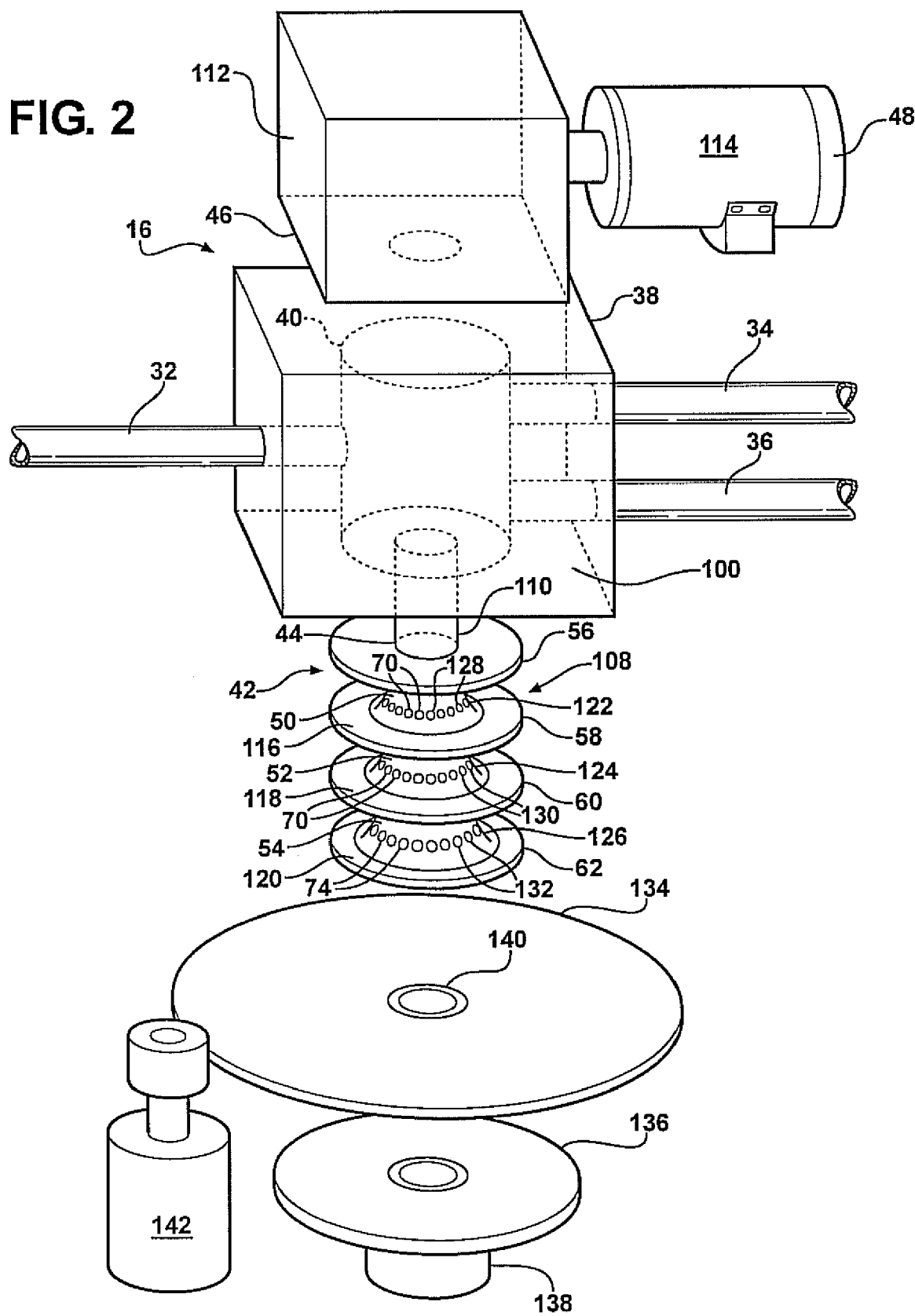
FIG. 2 is an exploded view of the extrusion head used in the apparatus of FIG. 1.

An exploded view of the extrusion head 16 is illustrated in FIG. 2. The extrusion head receives plastics from the extruders 10, 12 and 14 on lines 32, 34 and 36 respectively when the product to be formed is tricolored. The extruding head 16 is also capable of producing products with two colors or even a single color, although the advantages of the present invention are not obtained with a single colored product. The extruding head comprises an outer box 38 containing a central cavity 40, formed vertically through the box. A rotatable core, generally indicated at 42, is supported within the cavity. The core 42 includes a top cylindrical stem 44 which projects out of the top of the aperture 40 when assembled within the box 38. The core engages the output of a gearbox 46 which is driven by an electric motor 48 so as to rotate the core 42 within the box 38.

The core 42 includes three cylindrical concavely curved spools 50, 52 and 54. The spools are separated by cylindrical plates 56, 58, 60 and 62 which have outer diameters complementary to the inner diameter of the core 40 so that the outer surfaces of the disks 56, 58, 60 and 62 bear against the inner walls of the core 40. The passage 32 from the extruder 10 feeds into the core 52, defined by the plates 58 and 60. Similarly, the conduit 34 from extruder 12 feeds into the core 50, defined by the plates 56 and 58, and the conduit 36 from extruder 14 feeds into the core 54 defined by the cylindrical plates 60 and 62. Each of the cores 50, 52 and 54 has a number of passages extending onto the outer surface of the core. The passages are denominated 70 in the core 50, 72 in the core 52, and 74 and in the core 54. These passages are spaced at equal angular intervals about the perimeter of the core. In a preferred embodiment of the invention, there are the same number of passages in each of the cores, although in other embodiments this could vary. For purposes of illustration, it may be assumed that each core has twelve passages equally spaced about its perimeter. Two of the passages 70 in the core 50, two of the passages 72 in the core 52, and two of the passages 74 in the core 54 are illustrated in the cross section through the unit 54, illustrated in FIG. 4.

The passages in each of the spools are interleaved. That is, the passages each bear a different angular relationship with respect to the central axis. By way of example, the twelve passages in spool 50 might be arrayed at 0 degrees, 30 degrees, 60 degrees, 90 degrees, 120 degrees, 150 degrees, 180 degrees, 210 degrees, 240 degrees, 270 degrees, 300 degrees, and 330 degrees all with respect to the central axis of the spools; the passages in spool 52 at 10 degrees, 40 degrees, 70 degrees, 100 degrees, 130 degrees, 160 degrees, 190 degrees, 220 degrees, 250 degrees, 280 degrees, 310 degrees, and 340 degrees; the passages in spool 54 at 20 degrees, 50 degrees, 80 degrees, 110 degrees, 140 degrees, 170 degrees, 200 degrees, 230 degrees, 260 degrees, 290 degrees, 320 degrees, and 350 degrees.

Figure 3:
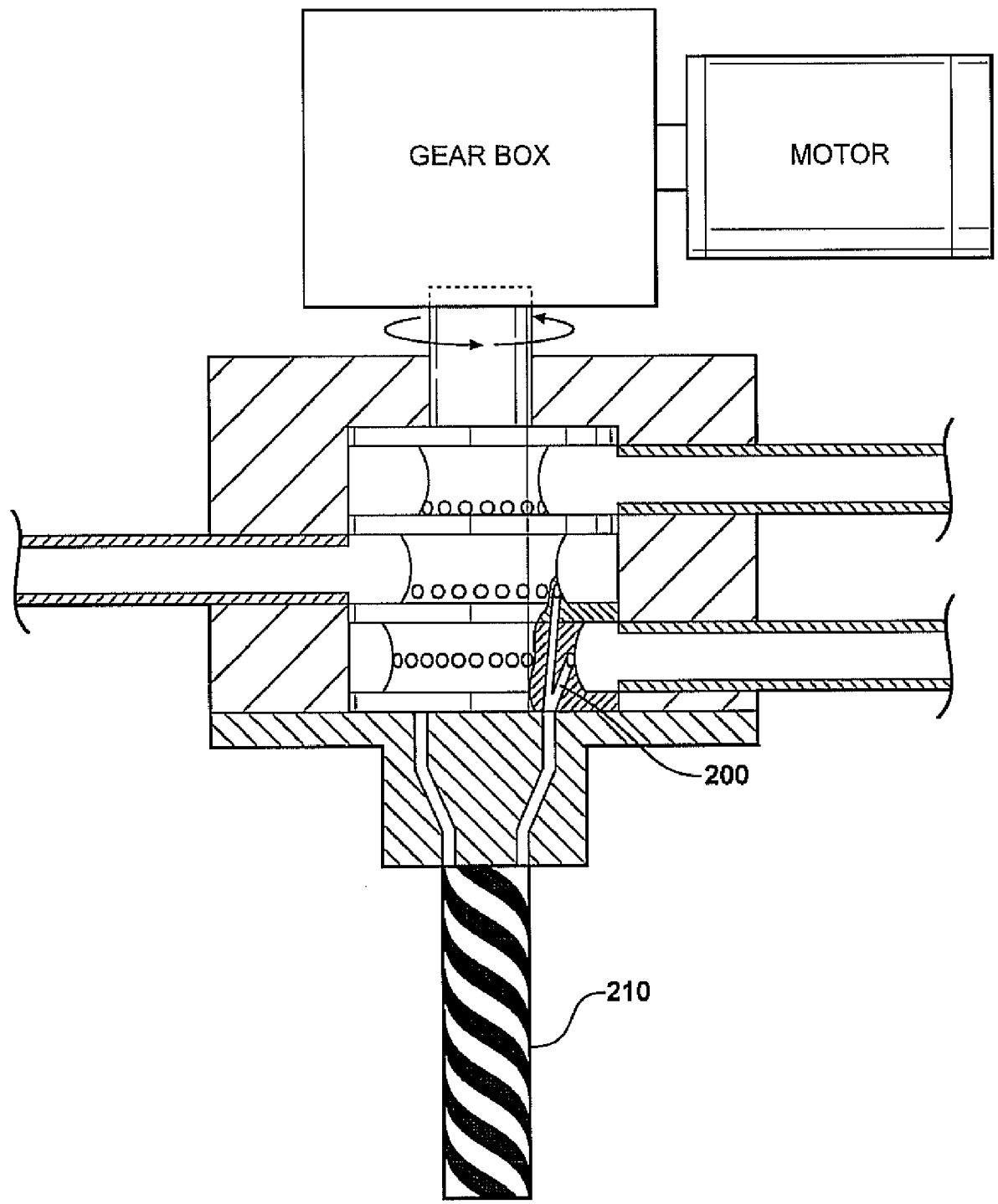
FIG. 3 is a view of the extrusion head partially in cross section.

All of the passages feed downwardly toward the central axis, malting gradual 90 degree bends, and terminating in an outer passage 200 (FIG. 3) that feeds to a pin and dye plate 136. The resultant extrusion 210 has a barber pole configuration as the spools are rotated through gear box 46.

The invention claimed is:

1. An extruding system for forming a cylindrical extrusion having a pattern of multiple colors, comprising:
    multiple extruders, each feeding plastic of one of said multiple colors;
    a rotatable extruder core comprising a plurality of cylindrical spools equal in number to the extruders, stacked one above the other about a common central axis, each spool having a plurality of circumferentially spaced passages extending from the outer perimeter of the core to a common interior output passage of the core, the circumferentially spaced passages of the spools being interleaved, each of the extruders feeding plastic to the outer perimeter of one of the spools so that the plastic flows through the spaced passages of that spool to the common interior output passage; and
    a drive rotating the stack of spools about said central axis to produce an output flow of multiple colors displaced laterally along the length of the flow.

2. The extruding system of claim 1 further comprising a molding apparatus to receive the output flow.

3. The extruding system of claim 2 wherein the molding apparatus is a blow molding apparatus.

4. The extruding system of claim 2 wherein the molding apparatus forms drinking cups.

5. The extruding system of claim 1 in which the drive is intermittently rotated during production of the cylindrical extrusion.

* * * * *